(12) United States Patent
Ebitani et al.

(10) Patent No.: US 8,736,912 B2
(45) Date of Patent: May 27, 2014

(54) IMAGE PROCESSING APPARATUS, IMAGE PROCESSING METHOD AND COMPUTER READABLE MEDIUM

(75) Inventors: Kenji Ebitani, Ashigarakami-gun (JP); Takeshi Noguchi, Ashigarakami-gun (JP); Hirofumi Komatsubara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1268 days.

(21) Appl. No.: 12/554,511

(22) Filed: Sep. 4, 2009

(65) Prior Publication Data
US 2010/0134849 A1    Jun. 3, 2010

(30) Foreign Application Priority Data
Dec. 3, 2008    (JP) ................................ 2008-308205

(51) Int. Cl.
*H04N 1/40*    (2006.01)

(52) U.S. Cl.
USPC ................. 358/448; 358/1.1; 355/40; 400/76

(58) Field of Classification Search
USPC ............... 358/448, 1.1, 1.13; 355/40; 400/76
See application file for complete search history.

(56) References Cited

U.S. PATENT DOCUMENTS

| | | | |
|---|---|---|---|
| 2004/0109147 A1* | 6/2004 | Redd et al. | 355/40 |
| 2004/0114155 A1* | 6/2004 | Kurahashi et al. | 358/1.1 |
| 2004/0128555 A1 | 7/2004 | Saitoh et al. | |
| 2006/0045596 A1* | 3/2006 | Tischler | 400/76 |

FOREIGN PATENT DOCUMENTS

| | | |
|---|---|---|
| JP | 10-023180 A | 1/1998 |
| JP | 2000-353171 A | 12/2000 |
| JP | 2002-024258 A | 1/2002 |
| JP | 2002-312385 A | 10/2002 |
| JP | 2004-192610 A | 7/2004 |
| JP | 2004-280654 A | 10/2004 |

OTHER PUBLICATIONS

Japanese Office Action, dated Nov. 30, 2010, issued in Application No. 2008-308205.

* cited by examiner

*Primary Examiner* — Mark K Zimmerman
*Assistant Examiner* — Michael Burleson
(74) *Attorney, Agent, or Firm* — Sughrue Mion, PLLC (57) ABSTRACT

An image processing apparatus includes a controller programmed to receive image data and also receive, from a user, an input number of separators included in the received image data. The controller detects a number of times a separator is included in the received image data based on criteria for detecting the separator, and determines, based on the detected number of times and the input number of separators, whether the criteria needs to be modified. In response to determining that the criteria needs to be modified, the controller modifies the criteria for detecting the separator and repeats detection of a number of times the separator is included in the received image data based on the modified criteria for detecting the separator.

26 Claims, 10 Drawing Sheets

| PAGE | DOCUMENT SEPARATOR | PAGE IMAGE MEMORY ADDRESS | THUMBNAIL IMAGE MEMORY ADDRESS |
|---|---|---|---|
| 1 | 1 | | |
| 2 | 0 | | |
| 3 | 0 | | |
| 4 | 0 | | |
| 5 | 0 | | |
| 6 | 0 | | |
| 7 | 0 | | |
| 8 | 0 | | |
| 9 | 0 | | |
| 10 | 0 | | |
| 11 | 1 | | |
| 12 | 0 | | |
| ⋮ | ⋮ | | |

IMAGE PROCESSING APPARATUS, IMAGE PROCESSING METHOD AND COMPUTER READABLE MEDIUM

CROSS-REFERENCE TO RELATED APPLICATIONS

This application is based upon and claims priority under 35 USC 119 from Japanese Patent Application No. 2008-308205, filed Dec. 3, 2008.

BACKGROUND

1. Technical Field

The present invention relates to an image processing apparatus, an image processing method and a computer readable medium.

2. Related Art

There is a technique to transform a plurality of paper documents into image data by a scanner equipped with an automatic sheet feeder. In this transformation, a method for creating an electronic document with respect to each original document has been conventionally proposed. For example, the following two methods are known:
(1) A method in which a separator sheet different from documents is inserted in a separation position of a document (namely, in the forefront or rearmost position of a document) and the separator sheet is detected by reading it so as to distinguish documents.
(2) A method in which such a separator sheet is not used for determining a document separator. For example, a size, a layout, a symbol or the like included in an image different among documents is recognized or character information (such as information that a character highly frequently appearing on a cover is included) obtained by character recognition technique or the like is used for distinguishing documents.

SUMMARY

According to an aspect of the invention, an image processing apparatus includes an image accepting module, a number accepting module, a discriminating module and a criterion modifying module. The image accepting module receives image data of a plurality of images. The number accepting module receives the number of images separating the received images received by the image accepting module. The number is input by a user. The discriminating module determines whether or not each of the received images corresponds to the images separating the received images based on a criterion. The criterion modifying module changes the criterion when the number of images determined as an image corresponding to the images separating the received images is not in a given relationship with the received number received by the number accepting module. The discriminating module determines, after the criterion is changed, whether or not each of the received images corresponds to the images separating the received images based on the modified criterion.

BRIEF DESCRIPTION OF THE DRAWINGS

Exemplary embodiments of the invention will be described in detail based on the following figures, wherein.

DETAILED DESCRIPTION

Now, exemplary embodiments for practicing the present invention will be described with reference to the accompanying drawings.

Figure 1:
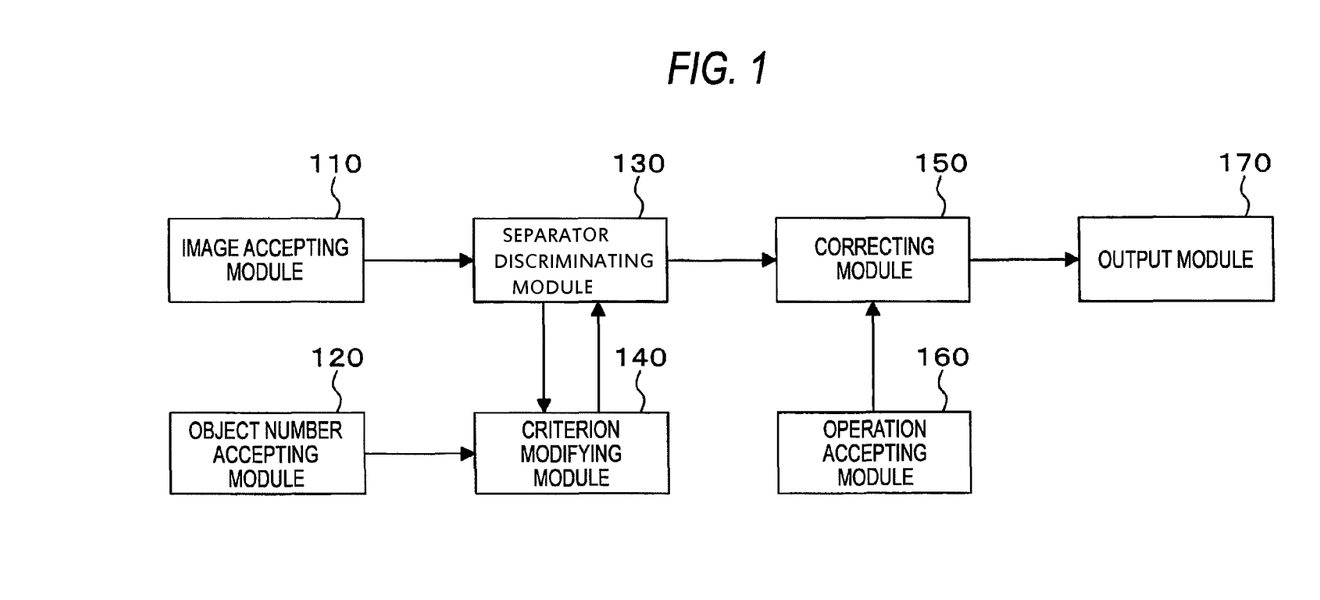
FIG. 1 is a diagram illustrating the configuration of conceptual modules for an exemplary configuration according to an exemplary embodiment of the invention.

FIG. 1 is a diagram illustrating the configuration of conceptual modules for an exemplary configuration according to this embodiment.

It is noted that a module means a component of software (a computer program), hardware or the like that can generally be logically separated. Accordingly, the term "module" used in this embodiment means not only a module of a computer program but also a module used in a hardware configuration. Therefore, the description of this embodiment also serves as the description of a computer program, a system and a method. Although terms "to store something", "to allow something to be stored" or equivalent terms are used for the convenience of explanation, these terms are to be interpreted as "to store something in a memory device" or "to control a memory device to store something" when the description of the exemplary embodiment is applied to the computer program. Furthermore, although each module corresponds to each function in substantially one-to-one correspondence, one module may be constituted by one program, plural modules may be constituted by one program or one module may be constituted by plural programs in actual application. Moreover, plural modules may be executed by one computer or one module may be executed by plural computers disposed in distributed or parallel environment. It is noted that one module may include another module. Furthermore, a term "connection" is herein used for physical connection as well as logical connection (such as relationships for receiving/sending data, issuing/receiving instructions and referring data).

Also, a system or an apparatus may be constituted by plural computers, hardware and apparatuses connected to one another through a communication means such as a network (including communication connection in one-to-one correspondence) or may be realized by one computer, hardware, apparatus or the like. The term "apparatus" and the term "system" are herein used as substantially synonyms. An expression "precedently determined" means "being determined before objective processing" and is used also with meanings of not only "being determined before starting processing of the exemplary embodiment" but also "being determined depending upon current or precedent situations/conditions even after starting processing of the exemplary embodiment".

An image processing apparatus of this embodiment divides plural images into documents by discriminating an image corresponding to a document separator, and includes, as illustrated in FIG. 1, an image accepting module 110, an object number accepting module 120, a separator discriminating module 130, a criterion modifying module 140, a correcting module 150, an operation accepting module 160 and an output module 170.

The image accepting module 110, which is connected to the separator discriminating module 130, accepts plural images and passes the images to the separator discriminating module 130. Accepting images includes, for example, reading images with a scanner, receiving images with a facsimile, reading images from, for example, an image database, or the like. The exemplary embodiment is particularly suitable for a case where a large number of images are read with a scanner by using an automatic sheet feeder. An image may be a binary image or a multilevel image including a color image. Also, the content of an image may be a document used for business or the like, an advertising brochure or the like.

Furthermore, images to be accepted include plural documents. One document includes continuous images, whereas one document may include merely one image.

As a document separator, for example, a separator sheet different from a document may be inserted in the forefront or rearmost position of each document. Instead of such a separator sheet, a separator may be indicated by a size, a layout, a symbol or the like included in an image different among documents. For example, a symbol included in an image may be a stamp or the like put on the forefront page of a document (an image including a stamp imprint image).

The object number accepting module 120 is connected to the criterion modifying module 140. Out of the images accepted by the image accepting module 110, the number of images corresponding to document separators is accepted through an operation performed by a user. The number is passed to the criterion modifying module 140. For example, the image processing apparatus is provided with keys (including numeric keys) and a touch panel, so as to accept an operation through them. The number of images corresponding to document separators is, for example, the number of the aforementioned separator sheets, the number of the forefront pages of the documents or the like. Therefore, the number of images corresponding to document separators substantially accords with the number of documents. The operation performed by a user may be accepted before, during or after accepting the images by the image accepting module 110.

The separator discriminating module 130 is connected to the image accepting module 110, the criterion modifying module 140 and the correcting module 150. The separator discriminating module 130 determines whether or not each of the images accepted by the image accepting module 110 is an image corresponding to a document separator, and passes the result of the determination to the criterion modifying module 140 and the correcting module 150. The determination is made on the basis of a precedently determined criterion. The criterion can be modified by the criterion modifying module 140. After the criterion is modified by the criterion modifying module 140, the separator discriminating module 130 determines again whether or not each of the images accepted by the image accepting module 110 is an image corresponding to a document separator.

The determination can be made by detecting a separator sheet inserted in the forefront or rearmost position of a document, or when such a separator sheet is not inserted, by detecting a size of the image, by detecting a layout (in which large characters are arranged in an uppermost portion of the image or multiple columns peculiar to a first page are employed), by detecting a symbol included in the image, or by detecting, through character recognition, an image including a large number of characters highly frequently appearing on a forefront page. In the following exemplary case, the determination is principally made by detecting an image including a stamp imprint image. In other words, it is assumed in the following case that a stamp is put on the forefront page of each document.

The criterion modifying module 140 is connected to the object number accepting module 120 and the separator discriminating module 130. When the number of images discriminated to correspond to document separators by the separator discriminating module 130 is not in a precedently determined relationship with the number of images accepted by the object number accepting module 120, the criterion modifying module 140 modifies the criterion employed for determining whether or not an image corresponds to a document separator by the separator discriminating module 130.

When the number of images discriminated to correspond to document separators by the separator discriminating module 130 is smaller than the number of images accepted by the object number accepting module 120 and a difference therebetween is larger than a precedently determined number, the criterion employed for determining whether or not an image corresponds to a document separator by the separator discriminating module 130 may be modified so that more images can be discriminated to correspond to document separators.

Furthermore, when the number of images discriminated to correspond to document separators by the separator discriminating module 130 is larger than the number of images accepted by the object number accepting module 120 and a difference therebetween is larger than a precedently determined number, the criterion employed for determining whether or not an image corresponds to a document separator by the separator discriminating module 130 may be modified so that fewer images can be discriminated to correspond to document separators.

Alternatively, the criterion employed for determining whether or not an image corresponds to a document separator by the separator discriminating module 130 may be modified when the number of images discriminated to correspond to document separators by the separator discriminating module 130 does not accord with the number of images accepted by the object number accepting module 120.

The correcting module 150 is connected to the separator discriminating module 130, the operation accepting module 160 and the output module 170. When the number of images discriminated to correspond to document separators by the separator discriminating module 130 is in the precedently determined relationship with the number of images accepted by the object number accepting module 120, the criterion modification of the criterion modifying module 140 is not performed but the discrimination result for an image corresponding to a document separator obtained by the separator discriminating module 130 is corrected through an operation performed by a user and accepted from the operation accepting module 160. The result of the correction is passed to the output module 170.

Alternatively, when a difference between the number of images discriminated to correspond to document separators by the separator discriminating module 130 and the number of images accepted by the object number accepting module 120 is not more than a precedently determined number, the discrimination result for an image corresponding to a document separator obtained by the separator discriminating module 130 may be corrected through an operation performed by a user and accepted from the operation accepting module 160.

Moreover, when there are plural discrimination results obtained by the separator discriminating module 130, the plural discrimination results may be presented, and when one of the discrimination results is selected, images discriminated to correspond to document separators by the separator discriminating module 130 in the selected discrimination result may be presented.

Furthermore, when the images discriminated to correspond to document separators are presented and one of the images is selected, images arranged from the selected image corresponding to a document separator up to an image corresponding to a next document separator may be presented. In other words, images presented at this point are extracted as one document. Also, images are presented hierarchically as a discrimination result, images discriminated to correspond to document separators and other images. Furthermore, an image to be presented at this point may be a thumbnail image (a reduced image), an icon indicating the image or the like.

The operation accepting module 160 is connected to the correcting module 150. The operation accepting module 160 accepts a correction operation performed by a user for correcting the discrimination result obtained by the separator discriminating module 130 and passes the accepted operation to the correcting module 150. For example, the image processing apparatus is provided with keys (including numerical keys) and a touch panel for accepting an operation performed through them. As the operation to be accepted at this point, while displaying, on a display, thumbnail images or the like of images discriminated to correspond to document separators, an image selected from the displayed images through the operation of a user is corrected to one not corresponding to a document separator, or on the contrary, while displaying thumbnail images of images discriminated not to correspond to document separators, an image selected from the displayed images through the operation of a user is corrected to one corresponding to a document separator.

The output module 170 is connected to the correcting module 150. The output module 170 outputs the result of the correction obtained by the correcting module 150 or outputs the discrimination result obtained by the separator discriminating module 130 when there is no need of correction by the correcting module 150. The discrimination result may be output as images. At this point, "outputting an image" herein includes printing an image with a printing device such as a printer, displaying an image on a display device such as a display, transmitting an image with an image transmitting device such as a facsimile, and writing an image in an image storing device of an image database or the like. It is noted that processing different among documents may be performed in outputting an image. For example, a security policy different among documents may be added. The security policy may be determined depending upon the kind of stamp imprint image put on each document. The kind of stamp imprint image may be recognized by the separator discriminating module 130.

Figure 2:
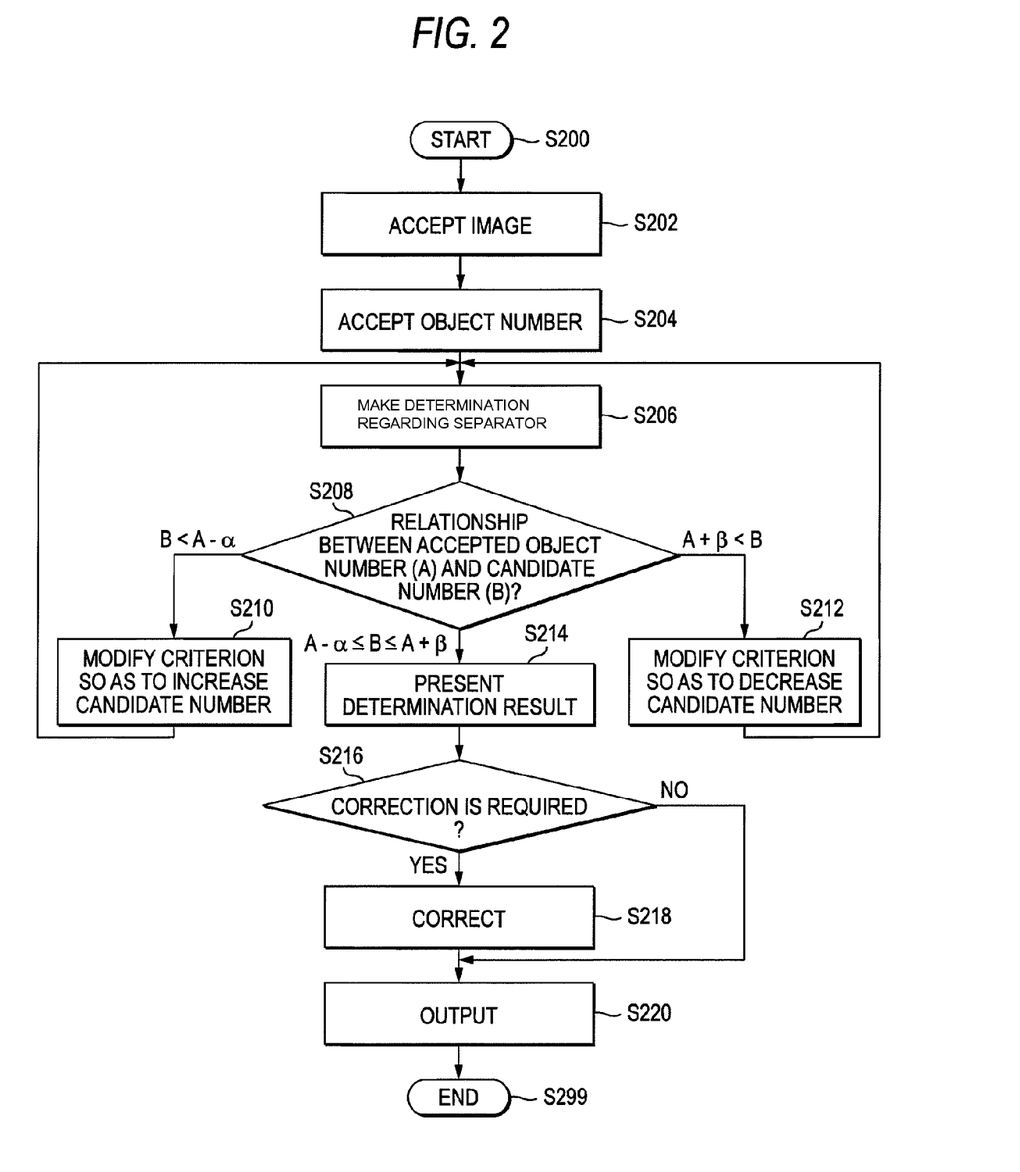
FIG. 2 is a flowchart illustrating exemplary processing of the exemplary embodiment of the invention.

FIG. 2 is a flowchart illustrating exemplary procedures in the processing of this embodiment.

In step S202, the image accepting module 110 accepts images.

In step S204, the object number accepting module 120 accepts an object number (i.e., the number of images corresponding to document separators) through an operation performed by a user.

In step S206, the separator discriminating module 130 determines whether or not each of the images accepted in step S202 is an image corresponding to a document separator.

Figure 4A:
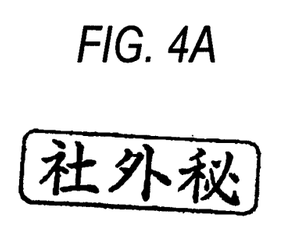
FIGS. 4A and 4B are explanatory diagrams of exemplary stamp imprint images.
Figure 4B:
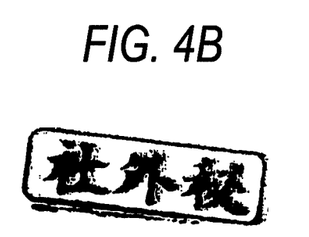

Herein, description will be given by exemplifying the case where a stamp imprint image is disposed on the forefront page of each document. FIGS. 4A and 4B are explanatory diagrams illustrating examples of the stamp imprint image. As illustrated in the examples of FIGS. 4A and 4B, a stamp of characters of "internal consumption" or the like is put (the kanji characters shown in FIGS. 3A and 3B mean "internal consumption"), and the stamp may be in a given color of red or the like. The example illustrated in FIG. 4A is comparatively easily recognized by using a method of pattern matching or the like, but since a stamp is occasionally manually put, a stamp imprint image may be sometimes formed, for example, as illustrated in FIG. 4B. It is presumed that the recognition rate is lower in this case, and correction is necessary in such a case.

Figure 5:
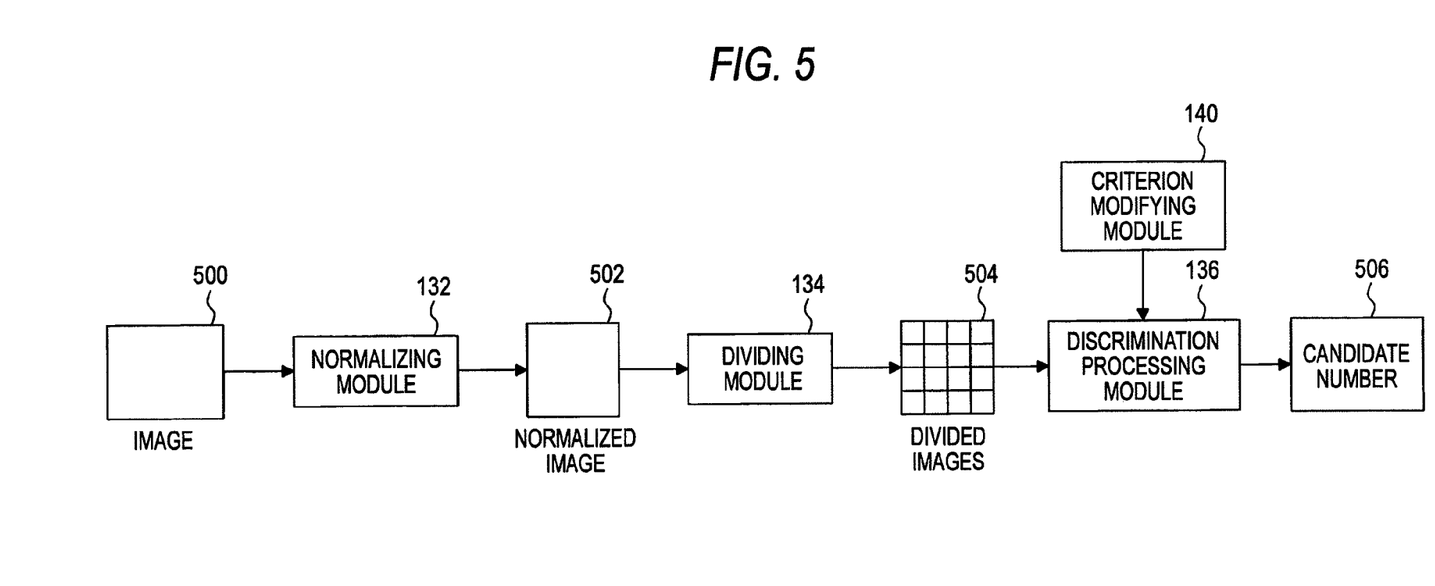
FIG. 5 is an explanatory diagram of exemplary processing performed by a separator discriminating module.

At this point, the discrimination processing performed by the separator discriminating module 130 will be described with reference to FIG. 5. FIG. 5 is an explanatory diagram illustrating exemplary processing performed by the separator discriminating module 130. The separator discriminating module 130 includes a normalizing module 132, a dividing module 134 and a discrimination processing module 136.

The normalizing module 132 receives an image 500 from the image accepting module 110. Then, the normalizing module 132 normalizes the image 500 and passes the thus obtained normalized image 502 to the dividing module 134. For normalizing, for example, the aspect ratio of the image 500 is changed to a precedently determined ratio. Furthermore, preprocessing (such as noise removal) may be additionally performed.

The dividing module 134 divides the normalized image 502 into blocks in a precedently determined number (or size) and passes the thus divided images 504 to the discrimination processing module 136.

The discrimination processing module 136 determines, on the basis of the criterion provided by the criterion modifying module 140, whether or not each of the divided images 504 includes a stamp imprint image and outputs a candidate number 506 (i.e., the number of images including a stamp imprint image) as the discrimination result. This discrimination is performed by, for example, extraction of features of the number of pixels of red or the like disposed in a precedently determined area, template matching of a stamp imprint image (which may be a partial image of the stamp imprint image such as a surrounding rectangle) or the like. As the criterion employed at this point, when the discrimination is performed by, for example, extracting the number of pixels of red or the like, a range of the number of pixels based on which it is determined that a stamp imprint image is included may be specified. Alternatively, when the discrimination is performed by template matching, a range of the matching degree may be specified. When the specified range is large, a stamp imprint image is determined to be included in more images, and when the specified range is small, a stamp imprint image is determined to be included in fewer images. Such modification of the criterion is carried out by the criterion modifying module 140.

Figure 6:
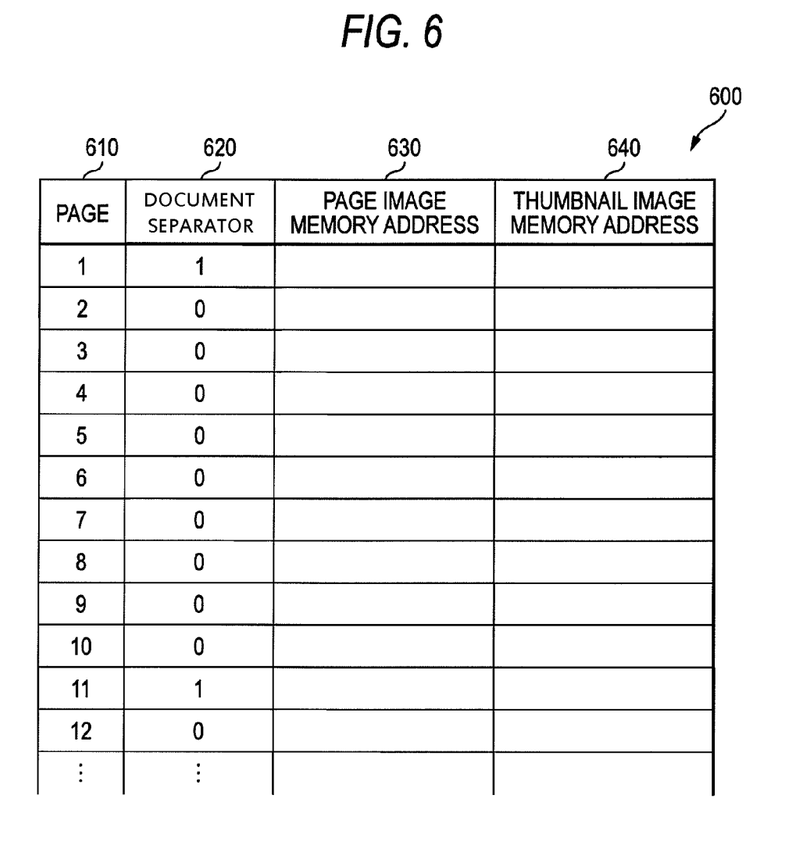
FIG. 6 is an explanatory diagram of an exemplary data structure of a discrimination result table.

The candidate number 506 may be output as a discrimination result table 600 as exemplarily illustrated in FIG. 6. FIG. 6 is an explanatory diagram illustrating an exemplary data structure of the discrimination result table 600. The discrimination result table 600 has a page column 610, a document separator column 620, a page image memory address column 630 and a thumbnail image memory address column 640. In the page column 610, page numbers successively provided to images accepted by the image accepting module 110 are stored. In the document separator column 620, "1" is stored in the case where it is determined by the separator discriminating module 130 that a stamp imprint image is included, and "0" is stored in the other case. The candidate number may be obtained by counting the number of "1" listed in the document separator column 620. In the page image memory address column 630, an address within a memory for storing each image accepted by the image accepting module 110 is stored. In the thumbnail image memory address column 640, an address within a memory for storing a thumbnail image of the image is stored. It is noted that a thumbnail image may be created by the separator discriminating module 130 or the like.

In step S208, the criterion modifying module 140 determines the relationship between the object number A accepted in step S204 and the candidate number B, that is, the number of images discriminated to include a stamp imprint image in step S206. When "B<A−α", the processing proceeds to step S210, when "A+β<B", the processing proceeds to step S212, and when "A−α≤B≤A+β", the processing proceeds to step S214, wherein α and β are the same or different integers greater than or equal to zero precedently determined. These integers may be determined, for example, depending upon the number of images accepted by the image accepting module 110 (namely, a total page number), or determined depending upon whether or not it is more efficient to allow a user to make correction without modifying the criterion when the accepted object number is different from the number of images discriminated to include a stamp imprint image.

Although the processing is branched in accordance with the relationships of "B<A−α", "A+β<B" and "A−α≤B≤A+β" in the above description, the processing may be branched in accordance with relationships of "B≤A−α", "A+β≤B" and "A−α<B<A+β". In this case, when "B≤A−α", the processing proceeds to step S210, when "A+β≤B", the processing proceeds to step S212, and when "A−α<B<A+β", the processing proceeds to step S214.

Figure 3:
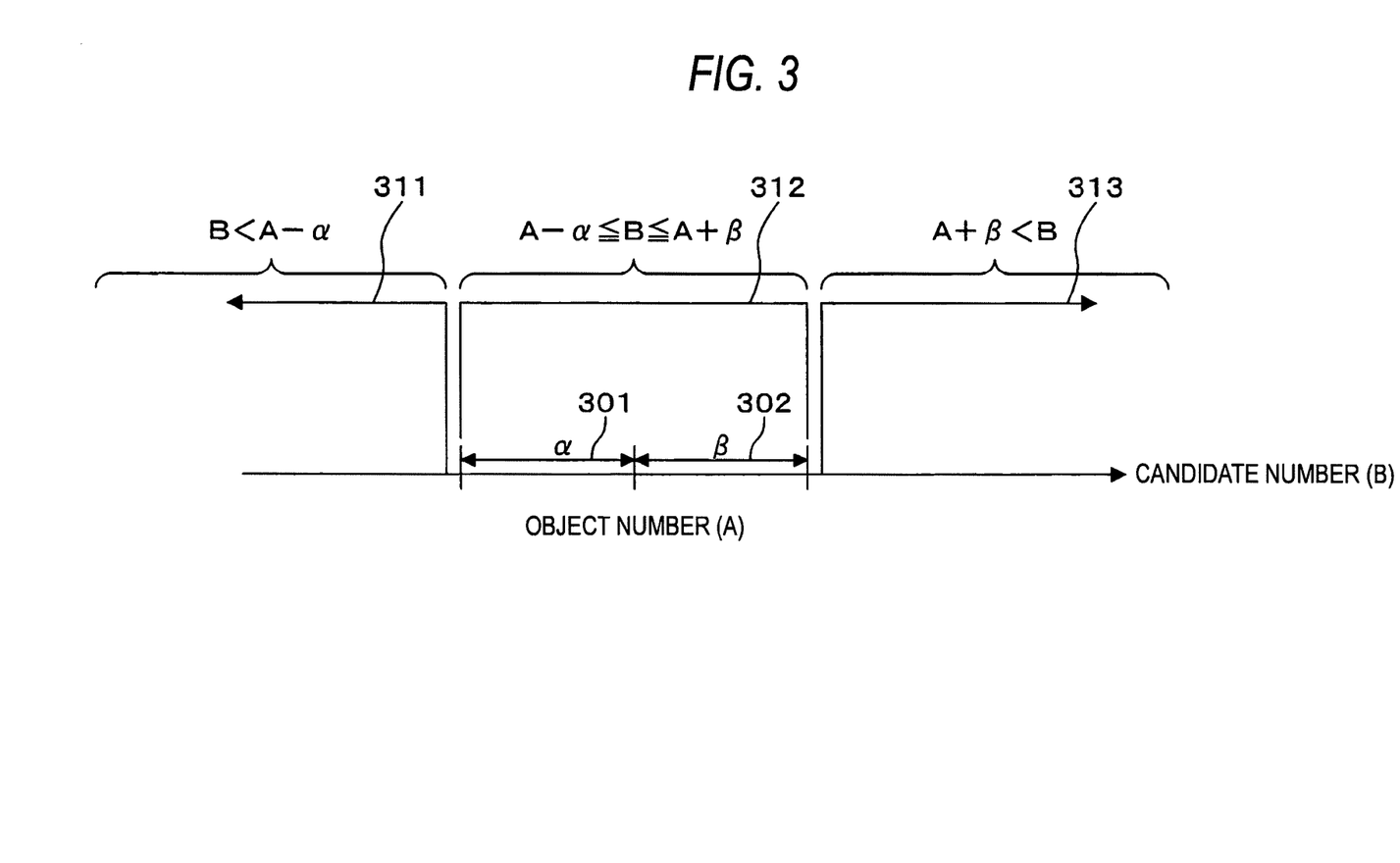
FIG. 3 is an explanatory diagram of exemplary relationships between an object number and a candidate number.

These relationships will be described with reference to an exemplary case illustrated in FIG. 3. FIG. 3 is an explanatory diagram illustrating exemplary relationships between the object number A and the candidate number B. In the case where the object number A and the candidate number B are plotted on a number line, when the candidate number B falls within a range 311 (namely, B<A−α), the processing proceeds to step S210, when it falls within a range 313 (namely, A+β<B), the processing proceeds to step S212 and when it falls within a range 312 (namely, A−α≤B≤A+β), the processing proceeds to step S214.

When the candidate number falls within the range 311, the criterion is modified (so that more images can be discriminated to correspond to a document separator) so as to allow the separator discriminating module 130 to make determination again rather than a user is allowed to make correction (for correcting an image having been discriminated not to correspond to a document separator to one corresponding to a document separator). Thus, the candidate number is to be converged to the range 312.

When the candidate number falls within the range 313, the criterion is modified (so that fewer images can be discriminated to correspond to a document separator) so as to allow the separator discriminating module 130 to make determination again rather than a user is allowed to make correction (for correcting an image having been discriminated to correspond to a document separator to one not corresponding to a document separator). Thus, the candidate number is to be converged to the range 312.

The range 312 is determined as tolerance for allowing a user to make correction. In the exemplary processing of this embodiment, the processing is proceeded assuming that there is a probability of correction even if A=B, and this is because even if the object number A accords with the candidate number B, a discriminated separator may not be correct in some case. Needless to say, the discrimination result may be directly output when A=B on the assumption that there is no need of correction in such a case.

In step S210, the criterion modifying module 140 modifies the criterion so as to increase the candidate number B. Then, the processing returns to step S206 for allowing the separator discriminating module 130 to perform its processing again.

In step S212, the criterion modifying module 140 modifies the criterion so as to decrease the candidate number B. Then, the processing returns to step S206 for allowing the separator discriminating module 130 to perform its processing again.

In step S214, the correcting module 150 presents the discrimination result, and when it is determined that there is a need of correction by a user (Y in step S216), the discrimination result obtained by the separator discriminating module 130 is corrected through an operation performed by the user in step S218. When it is determined in step S216 (N in step S216) that there is no need of correction, the processing proceeds to step S220.

In step S220, the output module 170 outputs images gathered with respect to each document.

Figure 7:
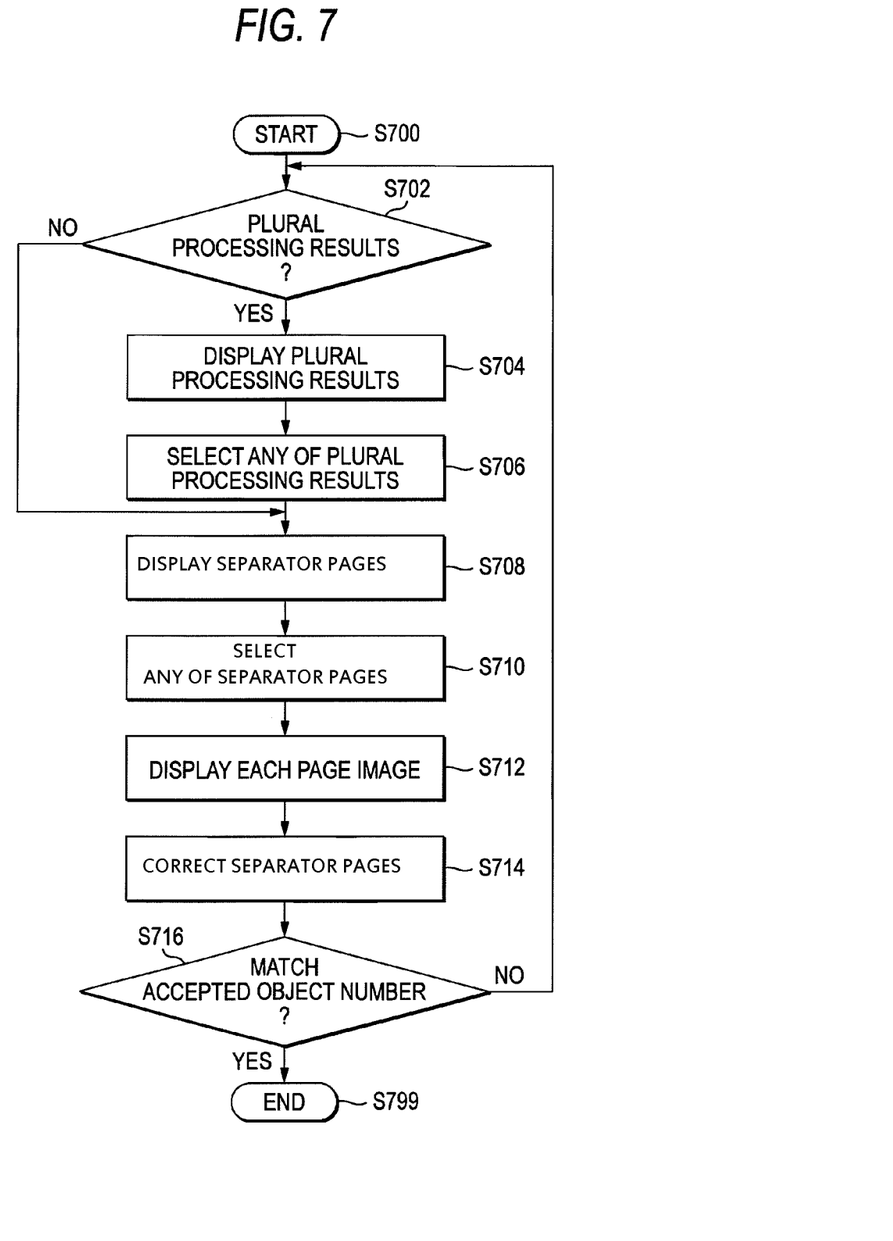
FIG. 7 is a flowchart illustrating exemplary correction processing.

FIG. 7 is a flowchart illustrating exemplary procedures in the correction processing performed by the correcting module 150.

In step S702, it is determined whether or not there is plural discrimination results obtained by the separator discriminating module 130. In the case where there is plural discrimination results (Y), the processing proceeds to step S704, and in the other case (N), the processing proceeds to step S708.

In step S704, the plural discrimination results are displayed on a display of the image processing apparatus. For example, they are displayed as illustrated in an exemplary display 800 of FIG. 8A. In the exemplary display 800 of FIG. 8A, a discrimination result A810, a discrimination result B820 and a discrimination result C830 are displayed. In other words, the separator discriminating module 130 has performed three discriminations, and the discrimination result A810 with a number of documents of 3 (namely, including 3 images corresponding to document separators), the discrimination result B820 with a number of documents of 4 (namely, including 4 images corresponding to document separators) and the discrimination result C830 with a number of documents of 2 (namely, including 2 images corresponding to document separators) are displayed.

Figure 8A:
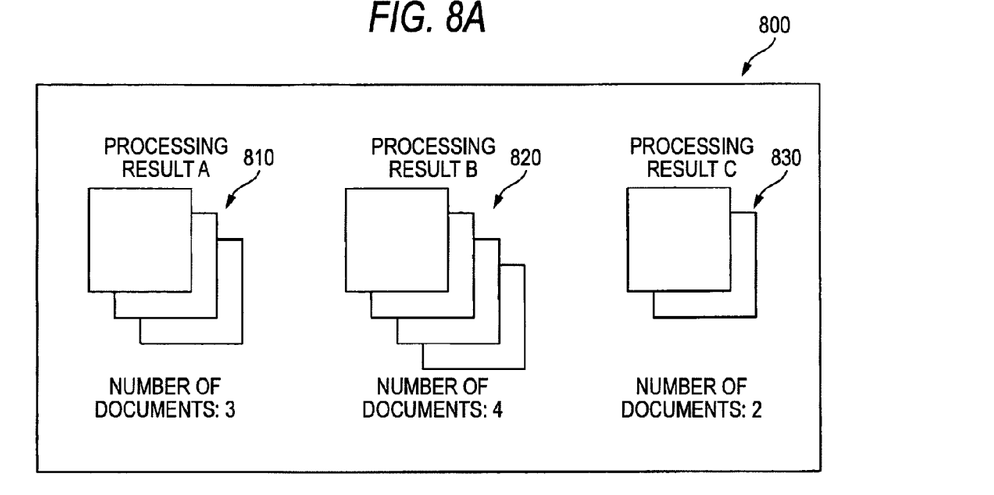
FIGS. 8A and 8B are explanatory diagrams illustrating exemplary images displayed on a display.

In step S706, one of the discrimination results (namely, one of the discrimination result A810, the discrimination result B820 and the discrimination result C830 in the exemplary case of FIG. 8A) is selected through an operation performed by a user accepted by the operation accepting module 160.

In step S708, forefront pages (namely, the images discriminated as the document separators) of the documents obtained as the discrimination result selected in step S706 are displayed. When the discrimination result A810 of the exemplary case of FIG. 8A is selected, the forefront pages are displayed in the display 800 as exemplarily illustrated in FIG. 8B. In the display 800 exemplarily illustrated in FIG. 8B, a separator A910, a separator B930 and a separator C950 are displayed.

Figure 8B:
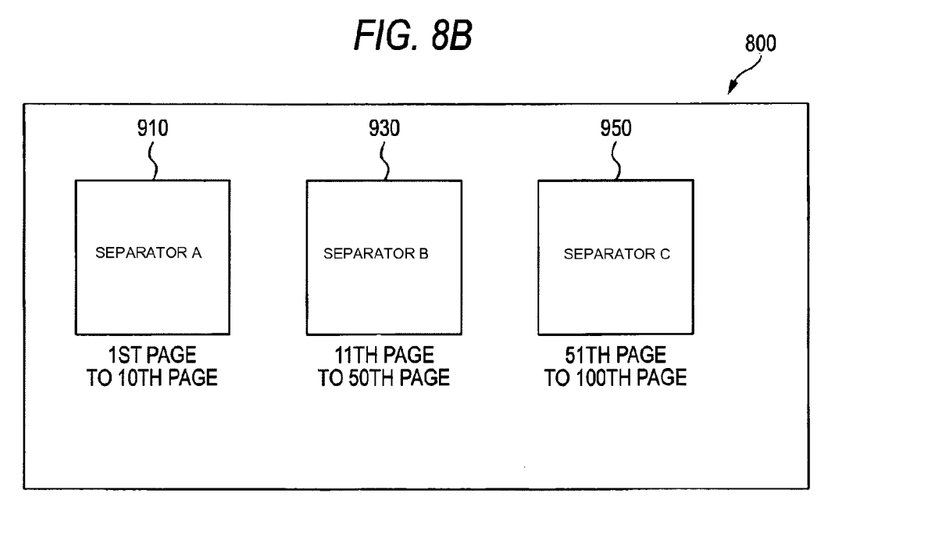

In step S710, one of the documents (namely, one of the separator A910, the separator B930 and the separator C950 in the exemplary case of FIG. 8B and (FIG. 9A) is selected through an operation performed by the user accepted by the operation accepting module 160.

Figure 9A:
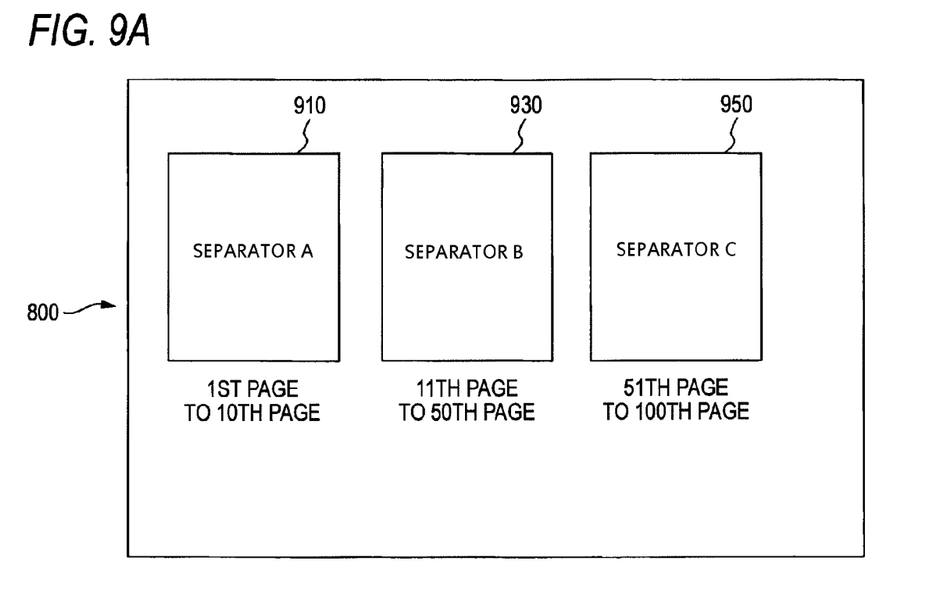
FIGS. 9A and 9B are explanatory diagrams illustrating exemplary images displayed on the display.
Figure 9B:
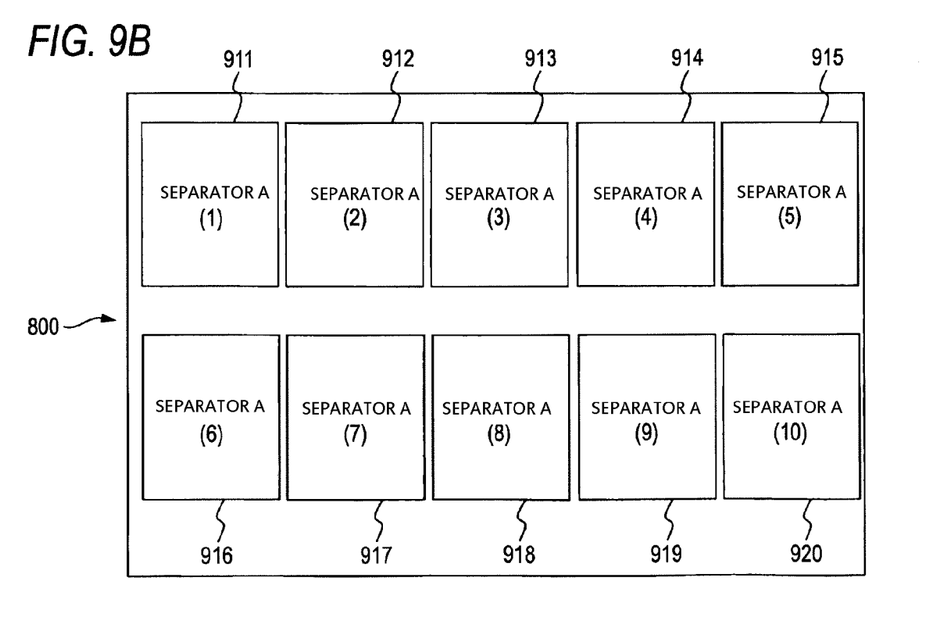

In step S712, respective page images of the document selected in step S710 are displayed. When the separator A910 exemplarily illustrated in FIG. 9A is selected, images are displayed in the display 800 as exemplarily illustrated in FIG. 9B. In the display 800 exemplarily illustrated in FIG. 9B, ten page images (thumbnail images) from a separator A(1)911 to a separator A(10)920 are displayed. It is noted that the separator A(10)920 corresponds to an image disposed immediately before the separator B930.

In step S714, an image discriminated not to correspond to a document separator is corrected to an image corresponding to a document separator through an operation performed by the user and accepted by the operation accepting module 160.

In step S716, in the case where the accepted object number A and the number of images corresponding to document separators obtained after the correction are the same (Y), the processing is completed (step S799), and in the other case (N), the procedure returns to step S702.

In the flowchart exemplarily illustrated in FIG. 7, an image discriminated not to correspond to a document separator is corrected to an image corresponding to a document separator, and instead, processing for correcting an image discriminated to correspond to a document separator to an image not corresponding to a document separator may be performed after the procedure of step S708.

Figure 10:
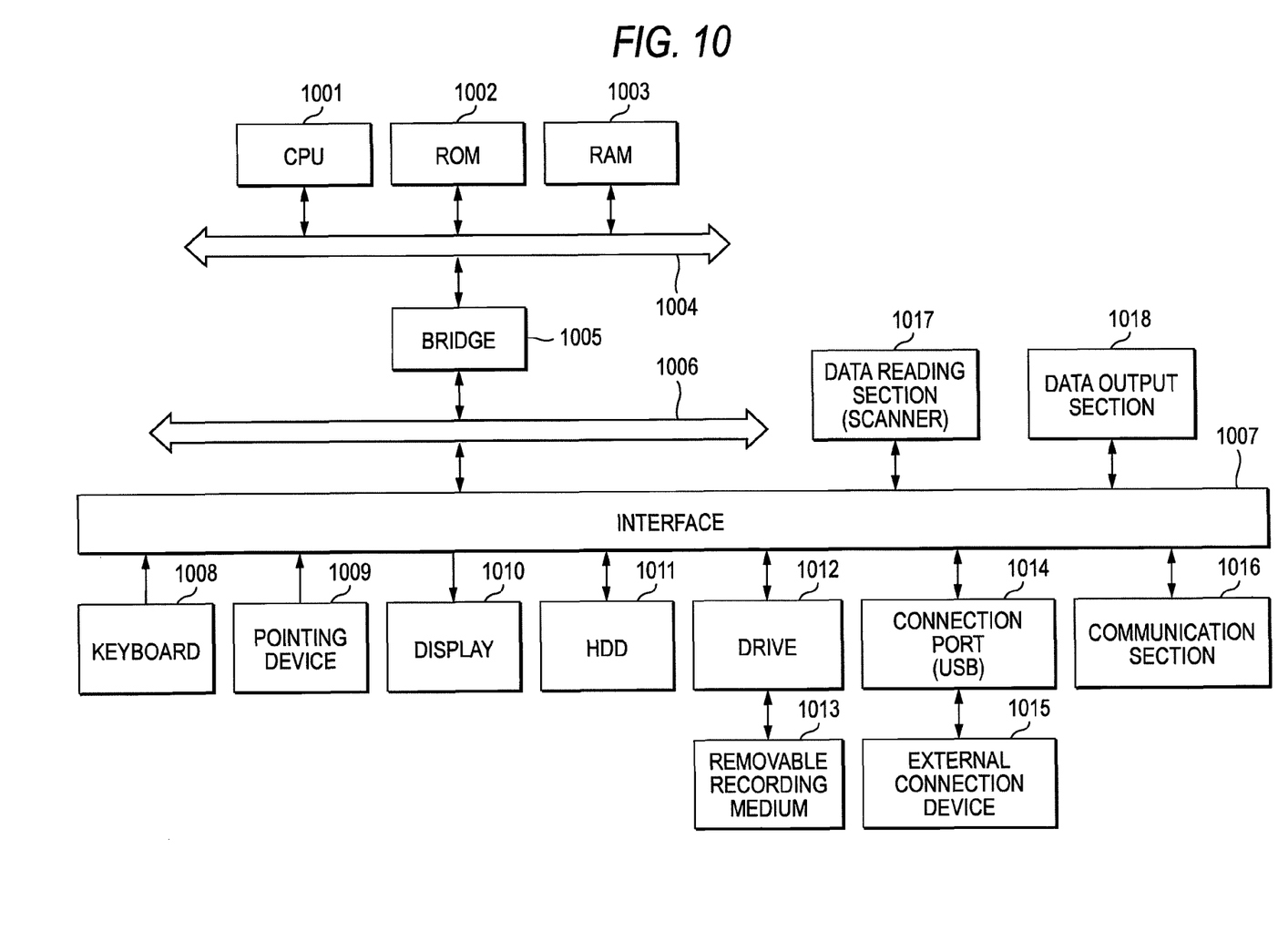
FIG. 10 is a block diagram illustrating exemplary hardware configuration of a computer for realizing the exemplary embodiment of the invention.

An exemplary hardware configuration for the image processing apparatus of this embodiment will be described with reference to FIG. 10. The configuration illustrated in FIG. 10 is attained by using, for example, a personal computer (PC) or the like and is an exemplary configuration including a data reading section 1017 such as a scanner and a data output section 1018 such as a printer.

A CPU (Central Processing Unit) 1001 is a control section that executes processing in accordance with a computer program describing execution sequences of the various modules described above, namely, the separator discriminating module 130, the criterion modifying module 140, the correcting module 150 and the like.

A ROM (Read Only Memory) 1002 stores a program, operation parameters and the like used by the CPU 1001. A RAM (Random Access Memory) 1003 stores a program used in execution of the CPU 1001 and parameters appropriately changed during the execution. They are connected to one another through a host bus 1004 including a CPU bus or the like.

The host bus 1004 is connected to an external bus 1006 such as a PCI (Peripheral Component Interconnect/Interface) bus through a bridge 1005.

A keyboard 1008 and a pointing device 1009 such as a mouse are input devices operated by a user. A display 1010 is a liquid crystal display, a CRT (Cathode Ray Tube) or the like, and displays various information as text or image information.

An HDD (Hard Disk Drive) 1011 contains a hard disk, drives the hard disk and records or reproduces a program executed by the CPU 1001 or information. The hard disk stores images accepted by the image accepting module 110, thumbnail images, results of the processing and the like. The hard disk further stores a variety of computer programs such as other various data processing programs.

A drive 1012 reads data or a program recorded in a removable recording medium 1013 loaded in the image processing apparatus, such as a magnetic disk, an optical disk, a magneto-optical disk or a semiconductor memory, and supplies the read data or program to the RAM 1003 connected through an interface 1007, the external bus 1006, the bridge 1005 and the host bus 1004. The removable recording medium 1013 can also be used as a data memory area similar to the hard disk.

A connection port 1014 is a port for connecting an external connection device 1015 and has a connection section of USB or IEEE 1394. The connection port 1014 is connected to the CPU 1001 and the like through the interface 1007, the external bus 1006, the bridge 1005, the host bus 1004 and the like. A communication section 1016 is connected to a network and executes external data communication processing. The data reading section 1017 is, for example, a scanner and executes document reading processing. The data output section 1018 is, for example, a printer and executes document data outputting processing.

Incidentally, the hardware configuration of the image processing apparatus illustrated in FIG. 10 is merely an example of the configuration, and this exemplary embodiment is not limited to the configuration of FIG. 10 but any configuration capable of executing the modules described in this embodiment can be employed. For example, a part of the modules may be constituted by dedicated hardware (such as an ASIC (Application Specific Integrated Circuit)), a part of the modules may be disposed in an external system connected through a communication line, or plural systems each as illustrated in FIG. 10 may be connected to one another through communication lines for performing cooperative operations. Furthermore, the image processing apparatus may be incorporated into a copying machine, a facsimile machine, a scanner, a printer or a multifunction machine (that is, an image processing apparatus having two or more functions out of functions of a scanner, a printer, a copying machine and a facsimile machine).

The aforementioned program may be stored in a recording medium for providing it or may be provided by a communication means. In this case, for example, the above-described program may be understood as an invention of a "computer-readable recording medium storing the program".

Herein, a "computer-readable recording medium storing a program" means a program-recorded computer-readable recording medium to be used for the purpose of installation, execution and marketing of a program.

It is noted that a recording medium includes, for example, a digital versatile disk (DVD) according to the standards settled by the DVD Forum, such as a DVD-R, a DVD-RW or a DVD-RAM and a DVD according to the standards settled by DVD+RW, such as a DVD+R or DVD+RW, a compact disk (CD) such as a read only memory (CD-ROM), a CD recordable (CD-R) or a CD rewritable (CD-RW), a Blu-ray Disc (registered trademark), a magneto-optical disk (MO), a flexible disk (FD), a magnetic tape, a hard disk, a read only memory (ROM), an electrically erasable and programmable read only memory (EEPROM), a flash memory and a random access memory (RAM).

The above-described program or a part thereof may be recorded in the recording medium for storage, marketing or the like. Alternatively, it may be transferred through communication with a wired network or a wireless network such as a local area network (LAN), a metropolitan area network (MAN), a wide area network (WAN), the Internet, an intranet or an extranet, or through a transmission medium obtained by combining them, or may be carried on a carrier wave.

Moreover, the above-described program may be a part of another program, or may be recorded in a recording medium together with another program. Alternatively, it may be recorded dividedly in plural recording media. Also, it may be recorded in any recoverable format of compression, encryption or the like.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The exemplary embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a controller configured to:
    receive image data;
    receive, from a user, an input number of separators included in the received image data;
    detect a number of times a separator is included in the received image data based on criteria for detecting the separator;
    determine, based on the detected number of times and the input number of separators, whether the criteria needs to be modified;
    modify, in response to determining that the criteria needs to be modified, the criteria for detecting the separator; and
    repeat detection of a number of times the separator is included in the received image data based on the modified criteria for detecting the separator.

2. The image processing apparatus according to claim 1, wherein the controller is configured to modify the criteria to increase the detected number when the detected number is smaller than the input number and a difference between the detected number and the input number is larger than a threshold value.

3. The image processing apparatus according to claim 1, wherein the controller is configured to modify the criteria to decrease the detected number when the detected number is larger than the input number and a difference between the detected number and the input number is larger than a threshold value.

4. The image processing apparatus according to claim 1, wherein the controller is configured to modify the criteria when the detected number does not match the input number.

5. The image processing apparatus according to claim 1, wherein the controller is further configured to accept, from the user, an input operation to correct the detected number without modifying the criteria when the detected number satisfies a predetermined relationship with respect to the input number.

6. The image processing apparatus according to claim 5, wherein the controller is configured to accept the input operation from the user to correct the detected number when a difference between the detected number and the input number is less than a threshold value based on the predetermined relationship.

7. The image processing apparatus according to claim 6, wherein the controller, in a process for allowing the user to correct the detected number, is configured to (i) present to the user a plurality of candidate separator sets for separating the received image data, and (ii) present, in response to the user selecting one of the presented candidate separator sets, separator images corresponding to separators included in the selected one of the candidate separator sets.

8. The image processing apparatus according to claim 7, wherein in response to the user selecting one of the presented separator images, the controller is configured to present, to the user, images between (i) the selected one of the presented separator images and (ii) a separator image presented subsequent to the selected one of the presented separator images in the selected one of the candidate separator sets, with the selected one of the presented separator images.

9. The image processing apparatus according to claim 5, wherein the controller, in a process for allowing the user to correct the detected number, is configured to (i) present to the user a plurality of candidate separator sets for separating the received image data, and (ii) present, in response to the user selecting one of the presented candidate separator sets via the input operation, separator images corresponding to separators included in the selected one of the candidate separator sets.

10. The image processing apparatus according to claim 9, wherein in response to the user selecting one of the presented separator images, the controller is configured to present, to the user, images between (i) the selected one of the presented separator images and (ii) a separator image presented subsequent to the selected one of the presented separator images in the selected one of the candidate separator sets, with the selected one of the presented separator images.

11. The image processing apparatus according to claim 1, wherein the separator comprises a predetermined image.

12. The image processing apparatus of claim 1, wherein the criteria for detecting the separator includes one of a number of pixels of a specified type in a predetermined area of the received image data and a template matching the separator.

13. An image processing method, the method comprising:
    receiving image data;
    receiving, from a user, an input number of separators included in the received image data;
    detecting a number of times a separator is included in the received image data based on criteria for detecting the separator;
    determining, based on the detected number of times and the input number of separators, whether the criteria needs to be modified;
    modifying, in response to determining that the criteria needs to be modified, the criteria for detecting the separator; and
    repeating detection of a number of times the separator is included in the received image data based on the modified criteria for detecting the separator.

14. The image processing method according to claim 13, wherein the modifying comprises modifying the criteria to increase the detected number when the detected number is smaller than the input number and a difference between the detected number and the input number is larger than a threshold value.

15. The image processing method according to claim 13, wherein the modifying comprises modifying the criteria to decrease the detected number when the detected number is larger than the input number and a difference between the detected number and the input number is larger than a threshold value.

16. The image processing method according to claim 13, wherein the modifying comprises modifying the criteria when the detected number does not match the input number.

17. The image processing method according to claim 13, further comprising:
    accepting, from the user, an input operation to correct the detected number without the modifying the criteria when the detected number satisfied a predetermined relationship with respect to the input number.

18. The image processing method according to claim 17, wherein the accepting comprises accepting the input operation from the user to correct the detected number when a difference between the detected number and the input number is less than a threshold value based on the predetermined relationship.

19. The image processing method according to claim 18, wherein a process for allowing the user to correct the detected number comprises:
    presenting to the user a plurality of candidate separator sets for separating the received image data; and
    presenting, in response to the user selecting one of the candidate separator sets via the input operation, separator images corresponding to separators included in the selected one of the candidate separator sets.

20. The image processing method according to claim 19, wherein the process further comprises:
    presenting to the user, in response to the user selecting one of the presented separator images, images between (i) the selected one of the presented separator images and (ii) a separator image presented subsequent to the selected one of the presented separator images in the selected one of the candidate separator sets, with the selected one of the presented separator images.

21. The image processing method according to claim 17, wherein a process for allowing the user to correct the detected number comprises:
    presenting to the user a plurality of candidate separator sets for separating the received image data; and
    presenting, in response to the user selecting one of the candidate separator sets via the input operation, separator images corresponding to separators included in the selected one of the candidate separator sets.

22. The image processing method according to claim 21, wherein the process further comprises:
    presenting to the user, in response to the user selecting one of the presented separator images, images between (i) the selected one of the presented separator images and (ii) a separator image presented subsequent to the selected one of the presented separator images in the selected one of the candidate separator sets, with the selected one of the presented separator images.

23. The image processing method according to claim 13, wherein the separator comprises a predetermined image.

24. The image processing method of claim 13, wherein the criteria for detecting the separator includes one of a number of pixels of a specified type in a predetermined area of the received image data and a template matching the separator.

25. A non-transitory computer-readable recording medium storing a program causing a computer to execute a process, the process comprising:
    receiving image data;
    receiving, from a user, an input number of separators included in the received image data;
    detecting a number of times a separator is included in the received image data based on criteria for detecting the separator;
    determining, based on the detected number of times and the input number of separators, whether the criteria needs to be modified;
    modifying, in response to determining that the criteria needs to be modified, the criteria for detecting the separator; and
    repeating detection of a number of times the separator is included in the received image data based on the modified criteria for detecting the separator.

26. The non-transitory computer-readable recording medium of claim 25, wherein the criteria for detecting the separator includes one of a number of pixels of a specified type in a predetermined area of the received image data and a template matching the separator.

* * * * *